Figure 1:
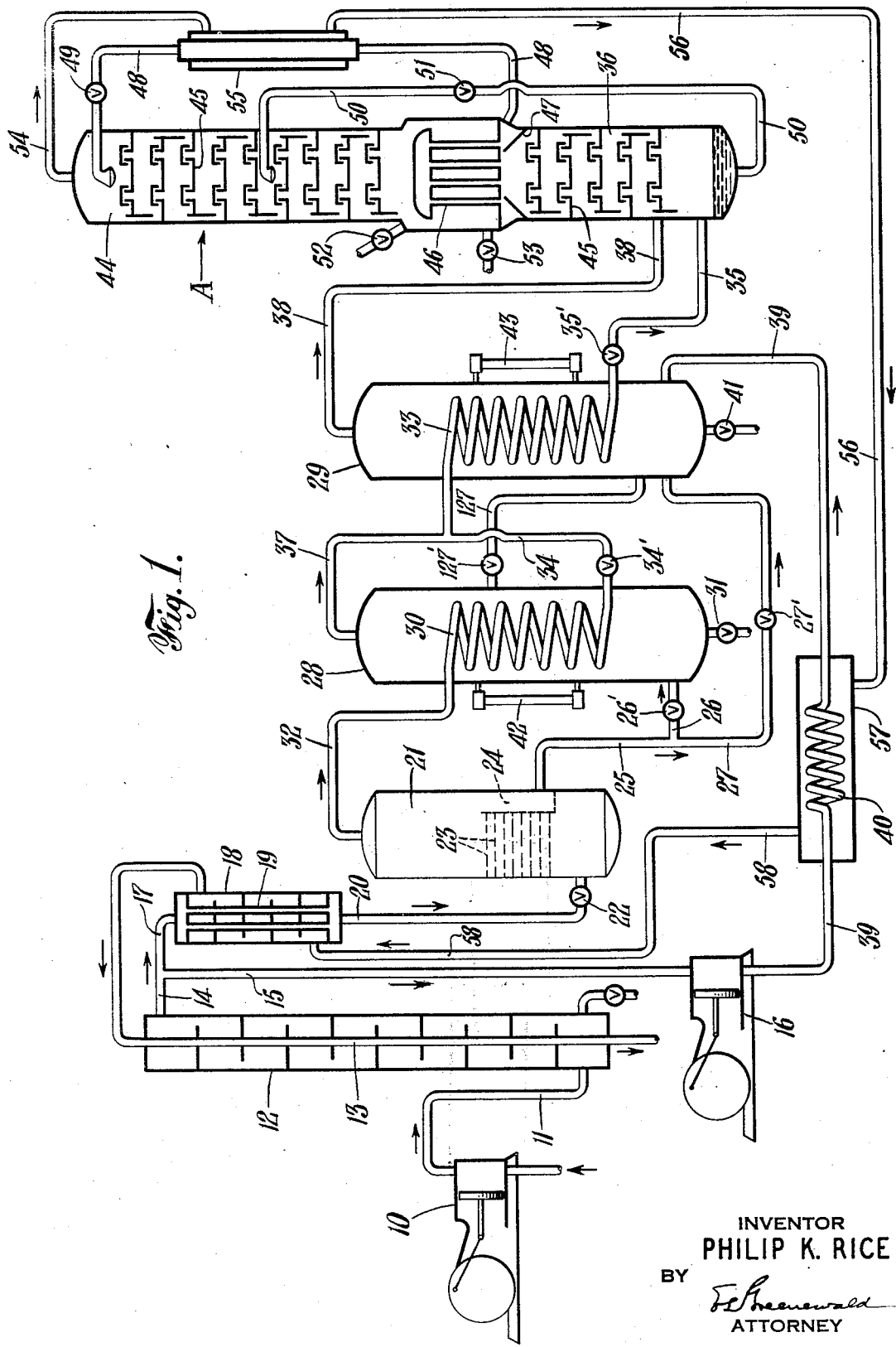

Aug. 24, 1943.  P. K. RICE  2,327,459
PROCESS OF AND APPARATUS FOR SEPARATING GAS MIXTURES
Filed June 5, 1942  2 Sheets-Sheet 1

INVENTOR
PHILIP K. RICE
BY
*F. C. Greenewald*
ATTORNEY

Patented Aug. 24, 1943

2,327,459

UNITED STATES PATENT OFFICE 2,327,459

PROCESS OF AND APPARATUS FOR SEPARATING GAS MIXTURES

Philip K. Rice, Kenmore, N. Y., assignor to The Linde Air Products Company, a corporation of Ohio Application June 5, 1942, Serial No. 445,946

16 Claims. (Cl. 62—175.5)

This invention relates to a process of and apparatus for separating gas mixtures, and more particularly to a process of and apparatus for eliminating higher boiling point impurities prior to the separation of gas mixtures, such as air, by low-temperature rectification. When separating a gas mixture such as air, which contains water vapor, carbon dioxide and hydrocarbon impurities that have normal boiling point and/or freezing point temperatures substantially higher than the boiling points of the gases to be separated, such as oxygen and nitrogen, it has been customary to eliminate the carbon dioxide as well as the water vapor prior to cooling the gas mixture to the low temperatures employed in the rectification. For carbon dioxide elimination the air may be passed through lime beds, or through scrubbing towers for washing the air with a carbon dioxide absorbing solution.

The presence of hydrocarbons in the air has caused considerable difficulty during air separation because such impurities tend to collect in certain portions of the rectification apparatus, and particularly in those portions where the oxygen is produced where their presence may constitute a serious hazard. The hydrocarbons exist in air in relatively minute proportions and are not readily removed during the customary treatment of the air. Additional hydrocarbons are added to the air due to the use of the customary lubricants in the air compressors. Attempts to minimize the hazards caused by hydrocarbon accumulation have included various procedures for separating the impurities from the liquid oxygen. Such methods, however, do not avoid permitting the hydrocarbons to come in contact with high-purity oxygen or to enter portions of the rectifying apparatus. It has also been proposed to remove hydrocarbon impurities from air prior to rectification by scrubbing the air with portions of liquid air at an intermediate pressure above the rectification pressure and then to evaporate a major portion of the scrubbing liquid to concentrate the impurities in the remainder of the liquid, which remainder is withdrawn. Such process is quite satisfactory for air separation systems in which gaseous oxygen is produced. However, when liquid oxygen is produced, that portion of the air which is expanded with external work cannot be expanded to the rectification pressure, but must be exhausted at an intermediate pressure higher than the rectification pressure for the purpose of evaporating the major portion of the scrubbing liquid. This results in a decrease in the amount of external work done by the expansion engines and a consequent loss in refrigerating effect to the system. To balance such loss, the compression pressure of the air must be higher than would be necessary if the low-pressure air could be supplied at rectification pressure.

In the description and claims the term "impurities" when applied to the separation of atmospheric air collectively includes the hydrocarbons previously mentioned together with any carbon dioxide that may not have been removed by a preliminary treatment of the air.

It is a principal object of the present invention to provide an improved method of and apparatus for eliminating higher boiling-point impurities from a gas mixture to be separated by rectification at low temperatures. Other objects of the invention are to provide a method of and apparatus for preventing impurities contained in air from entering the rectifying columns of an air-separating apparatus; for permitting the supply of a substantial portion of the gas mixture under a pressure only slightly above the rectification pressure and arranging for such air to be scrubbed free of impurities while the balance of the gas mixture is scrubbed with liquefied portions thereof under an intermediate pressure higher than the rectification pressure; to provide in a plant particularly for producing liquid oxygen, a method of and apparatus for concentrating the impurities in a liquid of relatively low-oxygen content while permitting the efficient vaporization of the relatively large amount of liquid required in such plant; and to provide improved apparatus for eliminating higher boiling-point impurities from air to be rectified which can be easily added to existing air-separation apparatus without substantial interference with the rectifying column or adversely affecting the efficiency of operation.

Figure 2:
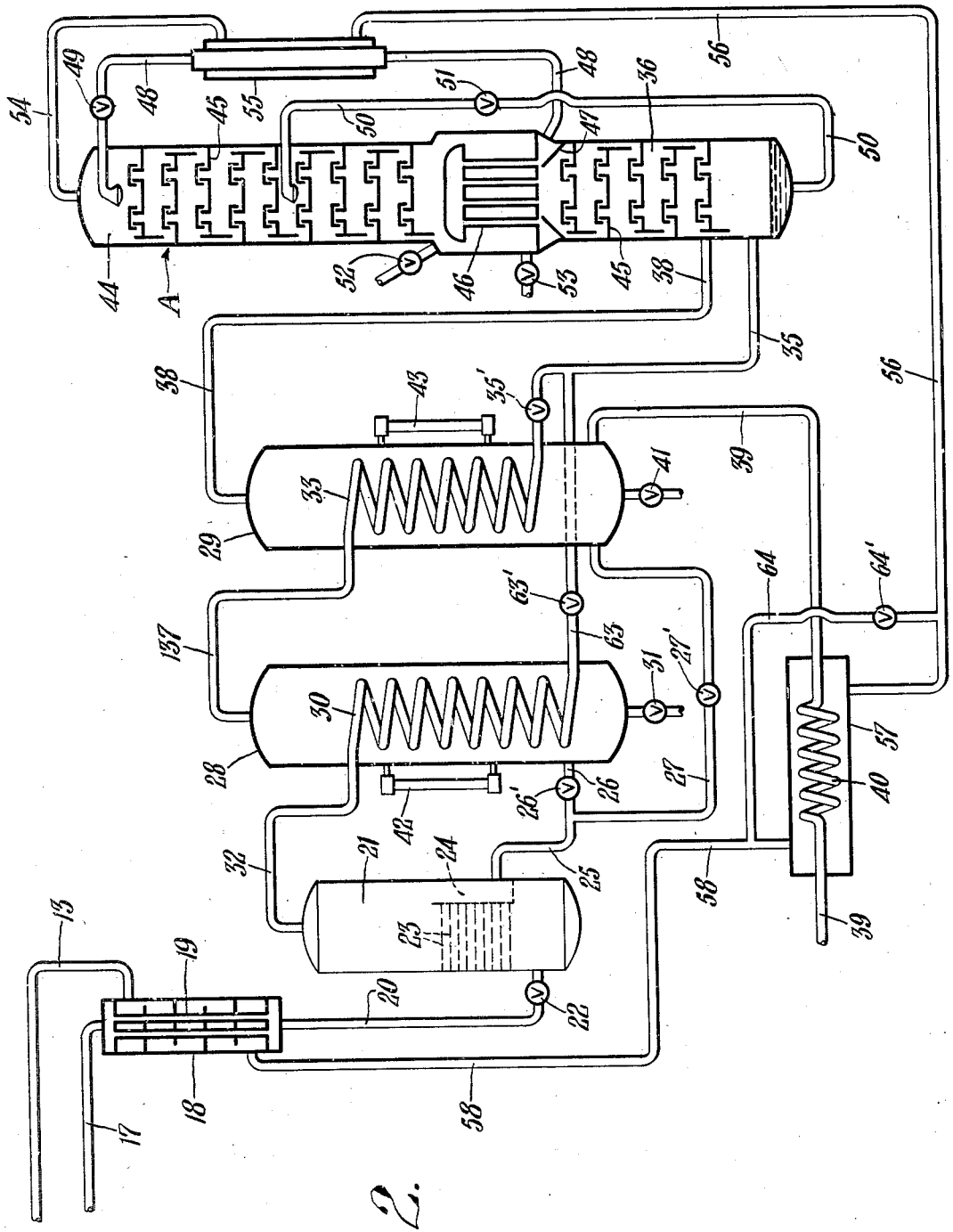

These and other objects and advantages of this invention will become apparent from the following description and the accompanying drawings in which:

Fig. 1 is a diagrammatic elevational view of an exemplary apparatus illustrating the principles of the invention; and Fig. 2 is a similar view of a portion of a modified form of the apparatus.

The principles of the present invention will be described in connection with an apparatus suitable more particularly for the processing of air to produce oxygen-rich and nitrogen-rich products. The gas mixture, particularly air to be rectified, may be decarbonated, compressed and cooled in the customary manner. A portion of the compressed dried and cooled air is expanded to an intermediate pressure substantially higher than the rectification pressure, under which conditions a portion becomes liquefied. The gaseous fraction is then scrubbed with the liquid fraction so that the liquid fraction will contain the impurities. This liquid fraction is vaporized by heat exchange with the gaseous fraction, the pressure of vaporization being lower than the intermediate pressure. The unevaporated remainder of the liquid fraction then constitutes a concentrate of the impurities which can be withdrawn.

The balance of the cooled air may be supplied under a pressure only slightly above rectification pressure and is scrubbed under such pressure with a liquid air scrubbing liquid. Such scrubbing liquid may be a portion of the liquid fraction of the original scrubbing, or may be a liquefied portion of the gaseous fraction after its pressure has been reduced to substantially rectification pressure or may be a combination of such portions. Such scrubbing liquid is substantially completely vaporized to form a second concentrate of the impurities which may be discarded and the vapors of said vaporization are passed into the rectification apparatus to be rectified along with the scrubbed portion of air supplied at the lower pressure and liquefied vapors that result from the vaporization of the first portion of the liquid fraction. In this manner all the air which is supplied to the rectification apparatus is freed of impurities while a substantial portion of the air can be supplied under a pressure which is only slightly higher than the rectification pressure.

Two methods of supplying the air under different pressures may be carried out. In one method, a high-pressure compressor supplies part of the air compressed to a relatively high pressure while the balance of the air is compressed by a separate low-pressure compressor. Such low-pressure air may be refrigerated by a refrigerating apparatus sufficiently to remove the moisture after which the low-pressure air may be cooled to substantially condensation temperature and then passed to the final scrubbing step. In another method of supplying the air at two pressures, all the air may be compressed to a relatively high pressure, cooled sufficiently to eliminate the moisture and then be divided into two portions, the one portion passing to the first scrubbing step, the other portion of the high-pressure air is expanded in an expansion engine in order to produce external work and thereby have its temperature reduced to a relatively low value by adiabatic expansion from the relatively high pressure to a pressure only slightly above the rectification pressure. Such expanded air may be further cooled to insure its being at substantially the condensation temperature whereby it is in condition for scrubbing in the low-pressure scrubbing step.

In a liquid oxygen plant two air streams of about equal quantity are furnished by the refrigerating equipment to the rectifying apparatus. The low-pressure stream, if it is cooled by waste nitrogen after expansion, will be essentially saturated gas. The high-pressure stream, after expansion to an intermediate pressure, will be more than one-half liquid. To evaporate this contaminated liquid by heat exchange with the limited amount of intermediate pressure gas available, a multiple effect evaporation arrangement is preferred according to the invention. To evaporate the contaminated liquid in a single effect would require raising the exhaust pressure of the expansion engines to provide additional pressure gas. Thus by the application of efficient evaporator principles, according to this invention, the expansion engines can exhaust at their normal exhaust pressure with a consequent greater refrigerating effect.

Referring now to the drawings, and particularly Fig. 1, there is illustrated an exemplary arrangement of apparatus for carrying out the principles of the invention as applied in a plant producing liquid oxygen. In this apparatus all the air is compressed to a relatively high pressure in a high-pressure compressor 10. This pressure may be as high as 3,000 pounds per square inch. The compressed air leaves the compressor 10 through a conduit 11 and enters a heat exchanger 12 which is arranged to remove substantially all the water vapor from the compressed air. Various refrigerating or other moisture removing means may be employed for the removal of the moisture, the heat exchanger 12 here shown being merely exemplary of such apparatus. The heat exchanger 12 is cooled by cold waste nitrogen passing through conduit 13. The cooled and moisture-free high-pressure air passes from the heat exchanger 12 through conduit 14 and then divides into two streams, one stream passing downward through conduit 15 to an expansion engine 16 and the other portion passes through the conduit branch 17 to a heat exchanger 18, having high-pressure air passages 19 therethrough. The high-pressure air is cooled and partially liquefied by the exchanger 18 from which it passes through a conduit 20 to the lower portion of an intermediate pressure scrubber 21. Before entering the scrubber 21, the high-pressure air is expanded from its high pressure to the intermediate pressure by an expansion valve 22. For air separation this intermediate pressure may preferably be about 150 pounds per square inch absolute.

In the scrubber 21 are preferably a series of perforated plates 23 to break up gas streams and cause intimate mixing of gas and liquid. The gaseous fraction of the high-pressure air is thus thoroughly scrubbed by the liquid fraction and the impurities in the high-pressure air stream are thereby retained in the liquid fraction. The scrubber 21 is provided with an overflow chamber 24 which collects the liquid fraction from a point above the plates 23 for passage through a conduit 25 which has branches 26 and 27 leading respectively to the lower ends of a vaporizer 28 and a scrubber-vaporizer 29.

The vaporizer 28 may be a cylindrical chamber having a heat-exchange pipe coil 30 therein and a drain connection 31 at the bottom thereof. The scrubbed gaseous fraction of the high-pressure air leaves the upper end of the scrubber 21 through the conduit 32 which passes it to the upper end of the heat-exchange coil 30. The scrubber-vaporizer 29 may likewise have the form of a cylindrical chamber having disposed therein a heat-exchange coil 33 which may also be arranged to act as a gas and liquid contact means to assist in the scrubbing action. The lower end of the coil 30 is connected to the upper end of the coil 33 by a conduit 34 controlled by a valve 34' and the lower end of the coil 33 is connected to the rectifying apparatus shown generally at A, by a conduit 35 controlled by a valve 35'. The conduit 35 preferably connects to the lower portion of a first-stage or high-pressure rectifying chamber 36 of a customary two-stage rectifying column. Vapors formed by the substantially complete vaporization of the liquid fraction introduced into the vaporizer 28 pass from the top thereof through a conduit 37 which joins conduit 34 so that the vapors from the vaporizer 28 may be combined with the material of the gas phase which has passed through the coil 30 and that the combined streams may pass through the heat-exchange coil 33 to be partially liquefied by heat exchange with the liquid fraction passed into the scrubber-vaporizer 29. The vapors resulting from the substantially complete vaporization of the liquid fraction in the scrubber-vaporizer 29 pass therefrom through a conduit 38 into the high-pressure chamber 36 of the rectifying apparatus. Branch conduits 26 and 27 are provided with regulating valves 26' and 27' which regulate the proportion of the liquid fraction which is passed respectively into the vaporizer 28 and the scrubber-vaporizer 29.

The scrubber-vaporizer 29 preferably operates under a pressure substantially the same as that of the first-stage or high-pressure rectifying chamber 36 which, in an air-separation apparatus, may be about 90 pounds per square inch absolute. The vaporizer 28 preferably operates under a pressure intermediate between that of the scrubber 21 and that of the scrubber-vaporizer 29; for example, about 120 pounds per square inch absolute when the scrubber 21 operates under a pressure of about 150 pounds per square inch absolute.

The portion of cold low-pressure air which is discharged by the expansion engine 16 may have a pressure substantially as low as the pressure of the scrubber-vaporizer 29 and is carried by a conduit 39 either directly to the scrubber-vaporizer 29 at the lower end thereof or such low-pressure air may be further cooled by a heat exchanger 40 interposed in the conduit 39. The low-pressure air preferably enters the scrubber-vaporizer 29 at a temperature substantially equal to its condensation temperature at 90 pounds per square inch absolute pressure. This low-pressure air is scrubbed by the liquid fraction passed into the scrubber-vaporizer 29 and the impurities contained in the low-pressure air are thereby retained in the scrubbing liquid. The cleaned low-pressure air passes from the scrubber-vaporizer through the conduit 38 into the rectifying apparatus. The concentrate of impurities which results from the substantially complete vaporization of the scrubbing liquid in the scrubber-vaporizer 29 may be withdrawn either continuously or periodically from the bottom of the scrubber-vaporizer through a drain connection 41. The vaporizer 28 and the scrubber-vaporizer 29 are each preferably provided with liquid-level indicating means such as liquid level gauges indicated at 42 and 43, respectively.

The air-separation apparatus A comprises the first-stage or high-pressure chamber 36 above which is a second-stage or low-pressure rectifying chamber 44, both chambers having therein suitable gas and liquid contact means 45. At the lower portion of the second-stage chamber 44 where the oxygen-rich component collects, there is a condenser 46 that furnishes heat for the second-stage rectifying chamber and condenses a nitrogen-rich fraction, part of which falls into the chamber 36 and part of which collects at a shelf 47 from which it is transferred by a conduit 48, controlled by an expansion valve 49, to the upper end of the chamber 44. The oxygen-bearing liquid collecting at the lower end of the chamber 36 is transferred by a conduit 50 controlled by a valve 51 to an intermediate portion of the chamber 44. If it is desired to draw off gaseous oxygen there is provided a valved withdrawal connection 52 at a point above the level of the liquid surrounding the condenser 46. The principles of this invention, however, are preferably applied to a plant for producing liquid oxygen and for such purposes the liquid oxygen product is withdrawn from a valved connection 53 at a point below the normal liquid level surrounding the condenser 46. The nitrogen product of separation leaves the upper end of the chamber 44 through a conduit 54 connected to the jacket of a heat exchanger 55 arranged to cool the material transferred from the shelf 47 in order to insure an adequate supply of reflux liquid in the chamber 44. From heat exchanger 55 a conduit 56 conducts the cold nitrogen through a jacket 57 surrounding the heat exchanger 40. The conduit 58 conducts the nitrogen product from the heat exchanger 57 to the cold end of the heat exchanger 18 from the warm end of which it is conducted by the conduit 13 to and through the heat exchanger 12.

The operation of the process according to one embodiment of the invention has been set forth in connection with the description of the apparatus shown in Fig. 1. When the product of the rectification is liquid oxygen withdrawn at connection 53, it is necessary to furnish the refrigeration equivalent of such liquid oxygen in addition to the refrigeration required to overcome heat leakage through the heat insulation that protects the apparatus and the requirements for rectification and effective heat exchange. The refrigeration equivalent of the liquid oxygen is supplied by furnishing to the rectifying column an equivalent quantity of the air in the liquid state and such liquid is produced by partial liquefaction of the high-pressure air to the extent required, by selection of the compression pressure, the degree of cooling, and by throttle expansion through the valve 22. The quantity of liquid fraction passing into the scrubber 21 is therefore a relatively large fraction of the high-pressure air stream passing through the branch conduit 17 since all the air passing through the branch 15 represents air passed into the rectifying column substantially entirely in gaseous form. The result is that there may be insufficient gas fraction leaving the scrubber 21 through conduit 32 to substantially completely vaporize all the liquid fraction by heat exchange in a single vaporizer.

According to the invention, the vaporization of the liquid fraction is carried out in two steps by employing an intermediate vaporizer 28 and passing as much of the liquid fraction through conduit 27 into the second vaporizer or scrubber-vaporizer 29 as can be substantially completely vaporized by heat exchange with the material flowing through coil 33. An increase of the amount of liquid in the scrubber-vaporizer 29 above desired levels can be observed at the gauge device 43 and the valve 27' accordingly regulated to prevent such increase. The excess liquid fraction may be passed by the branch 26 into the vaporizer 28 to be substantially completely vaporized therein by heat exchange with the gaseous fraction passing through the coil 30. By the conduit 37, the vapor produced in the vaporizer 28 is added to and supplements the material of the gaseous fraction passing from coil 30 to coil 33 through conduit 34. The net result is that all the material passing through the conduit 35 into the rectifying chamber 36 is substantially free of carbon dioxide and other impurities and the proportion of liquid in such material is equivalent in amount to the liquid fraction passed into the scrubber 21. As previously explained, when withdrawing the oxygen product in liquid form about 18 to 20% of the total air supplied to the column A must be in liquid form.

An alternative method of regulation can be practised by providing a connection 127 between the vaporizer 28 and the scrubber-vaporizer 29. Such connection may be controlled by a valve 127' and may connect to the vaporizer 28 at a point where the liquid level is to be maintained. When using the connection 127 the branch 27 need not be employed and the valve 27' remains closed. Thus, all the liquid fraction is passed into the vaporizer 28 and the part that is not vaporized therein is passed by conduit 127 into the scrubber-vaporizer 29.

Referring now to Fig. 2, there is illustrated an alternative arrangement of the apparatus in which similar elements are designated by the same reference numerals as in Fig. 1. This embodiment differs however in that the connection 34 of Fig. 1 is omitted and the lower end of the heat-exchange coil 30 is connected directly to the conduit 35 by a conduit 63 controlled by a valve 63'. The upper portions of the vaporizer chamber 28 and the heat-exchange coil 33 are connected by a conduit 137. This alternative arrangement permits the passage of all the impurity-free material of the gas phase from the coil 30 directly to the rectifying column chamber 36. A particular advantage results from the ability of the operator to control the pressure in the vaporizer 28 by the valve 35' alone while the pressure in the scrubber 21 can be regulated by the valve 63'.

The temperature of the low-pressure air entering through conduit 39 can be adjusted if desired by providing a by-pass 64 around the heat exchanger 57 controlled by a valve 64' and connected between conduits 56 and 58. Thus by opening the valve 64' less cold nitrogen will flow through the heat exchanger 57 and the cooling effect of that which does flow through the heat exchanger can be regulated.

It will be understood that certain features of this invention may be used independently of others and that changes in steps of the method and features of the apparatus may be made without departing from the principles of the invention. For example, the method and apparatus for removing the impurities may be also applied to plants for the separation of gas mixtures other than air that contain higher boiling-point impurities, and in air separation, the method and apparatus according to the invention may be employed solely to remove hydrocarbon impurities in plants where the carbon dioxide is previously completely removed from the air. However, it is possible to remove all the carbon dioxide in the original air by the process of this invention in cases where it is permissible to substantially increase the rate of withdrawal of the impurity-containing concentrate. If the chemical removal of carbon dioxide is omitted, the cooling of the air should be carried out in such manner that the carbon dioxide is carried along in the air stream in a finely divided form and for this purpose it is preferable to carry out a thorough dehydration of the air.

I claim:

1. A method of eliminating higher boiling-point impurities in the separation of a gas mixture by rectification at low temperatures which comprises providing a portion of such impurity-containing gas mixture compressed to a relatively high pressure, deeply cooled, and expanded to effect partial liquefaction; scrubbing the gaseous fraction of such cooled mixture with the liquid fraction thereof to concentrate said impurities substantially entirely in the liquid fraction; separating said gaseous and liquid fractions; dividing said liquid fraction into two liquid portions; substantially vaporizing one of said liquid portions at an intermediate pressure by heat exchange with said gaseous fraction thereby forming a concentrate of said impurities; substantially vaporizing the other of said liquid portions at a pressure lower than said intermediate pressure by heat exchange with said gaseous fraction to form another concentrate of said impurities; withdrawing both of such impurity-containing concentrates; and passing the impurity-free substantially liquefied material of said gaseous fraction and the vapors of said vaporizations into rectifying apparatus for separation of said gas mixture in the absence of said impurities.

2. A method for eliminating higher boiling-point impurities in the separation of a gas mixture by rectification at low temperatures which comprises providing a portion of such impurity-containing gas mixture compressed to a relatively high pressure, deeply cooled, and expanded to effect partial liquefaction; scrubbing the gaseous fraction of such cooled mixture with the liquid fraction thereof to concentrate said impurities substantially entirely in the liquid fraction; separating said gaseous and liquid fractions; dividing said liquid fracton into two liquid portions; substantially vaporizing one of said liquid portions at an intermediate pressure by heat exchange with said gaseous fraction thereby forming a concentrate of said impurities and effecting partial liquefaction of said gaseous fraction; reducing the pressure of the material of said gaseous fraction and thereafter combining it with the vapors of said vaporization; vaporizing the other of said liquid portions at a pressure lower than said intermediate pressure by heat exchange with the combined vapors and material of said gaseous fraction to form a second concentrate of said impurities; withdrawing both of such impurity-containing concentrates; and passing the impurity-free substantially liquefied combined vapor and material of said gaseous fraction and the impurity-free vapor of said vaporization of said other liquid portion into rectifying apparatus for separation of the gas mixture into components in the absence of said impurities.

3. A method for eliminating higher boiling-point impurities in the separation of a gas mixture by rectification at low temperatures which comprises providing a portion of such impurity-containing gas mixture compressed to a relatively high pressure, deeply cooled and expanded to effect partial liquefaction; scrubbing the gaseous fraction of such cooled mixtures with the liquid fraction thereof to concentrate said impurities substantially entirely in the liquid fraction; separating said gaseous and liquid fractions; dividing said liquid fraction into two liquid portions; substantially vaporizing one of said liquid portions at an intermediate pressure by heat exchange with said gaseous fraction thereby forming a concentrate of said impurities; providing a second portion of such impurity-containing gas mixture under a pressure only slightly above the desired rectification pressure and cooled to about the condensation temperature at such pressure; reducing the pressure of the second of said liquid portions to about said rectification pressure to form a scrubbing liquid; scrubbing said second portion of impurity-containing gas mixture with such scrubbing liquid; substantially vaporizing the scrubbing liquid by heat exchange with both the vapors of said first vaporization and material of said gaseous fraction to form a second concentrate of said impurities; withdrawing both of such impurity-containing concentrates; and passing the scrubbed second portion of the gas mixture, the vapors of the last-mentioned vaporization, and the combined partly liquefied gas material of said first vaporization and of said gaseous fraction into rectifying apparatus for separation of the gas mixture into components in the absence of said impurities.

4. A method for eliminating higher boiling-point impurities in the separation of a gas mixture by rectification at low temperatures which comprises providing a portion of such impurity-containing gas mixture at a temperature and pressure such that a substantial fraction thereof is liquefied; scrubbing the gaseous fraction of such cooled mixture with the liquid fraction thereof to concentrate said impurities substantially entirely in the liquid fraction; separating said gaseous and liquid fractions; substantially vaporizing a portion of said liquid fraction at an intermediate pressure by heat exchange with said gaseous fraction thereby forming a concentrate of said impurities and at least partially liquefying said gaseous fraction; providing a second portion of such impurity-containing gas mixture under a pressure only slightly above the desired rectification pressure and cooled to about its condensation temperature at such pressure; scrubbing such second portion of the gas mixture with the remainder of said liquid fraction at about rectification pressure to collect the impurities substantially entirely in the scrubbing liquid; substantially vaporizing such scrubbing liquid by heat exchange with vapors of said first vaporization to form a second concentrate of impurities and at least partially liquefy such vapors; withdrawing both impurity-containing concentrates; and passing the scrubbed second portion of gas mixture, the vapors of said second vaporization and the material of the vapor formed in said first vaporization into rectifying apparatus for separation treatment in the absence of said impurities.

5. A method for eliminating higher boiling-point impurities in the separation of a gas mixture such as air by rectification at low temperatures which comprises providing a supply of such impurity-containing air compressed to a relatively high pressure and cooled to a temperature substantially above the point of liquefaction; dividing such air into two portions; expanding one of such portions with the production of external work to form a low-pressure air stream cooled to substantially its condensation temperature; cooling the other portion of said air sufficiently to effect partial liquefaction thereof and expanding same to form a high-pressure partially-liquefied air stream; scrubbing the gaseous fraction of such high-pressure air stream with the liquid fraction thereof to concentrate the impurities contained in said high-pressure air stream substantially entirely in said liquid fraction; separating said gaseous and liquid fractions; substantially vaporizing a portion of said liquid fraction at an intermediate pressure by heat exchange with said gaseous fraction to partially liquefy said gaseous fraction; reducing the pressure of the remainder of said liquid fraction to about the rectification pressure to form a scrubbing liquid; scrubbing said low-pressure air stream with said scrubbing liquid to retain substantially all the impurity originally in said low-pressure air stream in the scrubbing liquid; substantially vaporizing said scrubbing liquid by heat exchange with the vapors of said first vaporization to form a concentrate of said impurities; withdrawing said concentrate; and passing the scrubbed low-pressure air stream, the vapors of said last-mentioned vaporization, and the material of said first-mentioned vaporization and of said gaseous fraction into rectifying apparatus for separation of the air into components in the absence of said impurities.

6. A method for eliminating higher boiling-point impurities in the separation of a gas mixture by rectification at low temperatures which comprises providing a portion of such impurity-containing gas mixture at a temperature and pressure such that a substantial fraction thereof is liquid; scrubbing the gaseous fraction of such cooled mixture with the liquid fraction thereof to concentrate said impurities substantially entirely in the liquid fraction; separating said gaseous and liquid fractions; vaporizing a portion of said liquid fraction at an intermediate pressure by heat exchange with said gaseous fraction; substantially vaporizing the remainder of said liquid fraction at a pressure lower than said intermediate pressure by heat exchange with the vapors of said first vaporization to form a concentrate of said impurities; withdrawing such impurity-containing concentrate; and passing the impurity-free substantially liquefied material of said gaseous fraction and the vapors of said vaporizations into rectifying apparatus for separation of said gas mixture in the absence of said impurities.

7. A method for eliminating higher boiling-point impurities in the separation of a gas mixture by rectification at low temperatures which comprises providing a portion of such impurity-containing gas mixture at a temperature and pressure such that a substantial fraction thereof is liquid; scrubbing the gaseous fraction of such cooled mixture with the liquid fraction thereof to concentrate said impurities substantially entirely in the liquid fraction; separating said gaseous and liquid fractions; vaporizing a portion of said liquid fraction at an intermediate pressure by heat exchange with said gaseous fraction; effecting partial liquefaction of said gaseous fraction; reducing the pressure of the material of said gaseous fraction and thereafter combining it with the vapors of said vaporization; vaporizing the remainder of said liquid fraction at a pressure lower than said intermediate pressure by heat exchange with the combined vapors and material of said gaseous fraction to form a concentrate of said impurities; withdrawing such impurity-containing concentrate; and passing the impurity-free substantially liquefied combined vapor and material of said gaseous fraction and the impurity-free vapor of said vaporization of said remaining liquid fraction into rectifying apparatus for separation of the gas mixture into components in the absence of said impurities.

8. A method for eliminating higher boiling-point impurities in the separation of a gas mixture by rectification at low temperatures which comprises providing a portion of such impurity-containing gas mixture compressed to a relatively high pressure, deeply cooled and expanded to effect partial liquefaction; scrubbing the gaseous fraction of such cooled mixture with the liquid fraction thereof to concentrate said impurities substantially entirely in the liquid fraction; separating said gaseous and liquid fractions; vaporizing a portion of said liquid fraction at an intermediate pressure by heat exchange with said gaseous fraction; providing a second portion of such impurity-containing gas mixture under a pressure only slightly above the desired rectification pressure and cooled to about the condensation temperature at such pressure; reducing the pressure of the remaining liquid fraction to about said rectification pressure to form a scrubbing liquid; scrubbing said second portion of impurity-containing gas mixture with said scrubbing liquid; substantially vaporizing said scrubbing liquid by heat exchange with the vapors of said first vaporization to form a concentrate of said impurities; withdrawing such impurity-containing concentrate; and passing the scrubbed second portion of the gas mixture, the vapors of the last-mentioned vaporization, and the combined partly liquefied gas material of said first vaporization and of said gaseous fraction into rectifying apparatus for separation of the gas mixture into components in the absence of said impurities.

9. A method for eliminating higher boiling-point impurities in the separation of a gas mixture by rectification at low temperatures which comprises providing a portion of such impurity-containing gas mixture compressed to a relatively high pressure deeply cooled and expanded to effect partial liquefaction; scrubbing the gaseous fraction of such cooled mixture with the liquid fraction thereof to concentrate said impurities substantially entirely in the liquid fraction; separating said gaseous and liquid fractions; vaporizing a portion of said liquid fraction at an intermediate pressure by heat exchange with said gaseous fraction thereby at least partially liquefying said gaseous fraction; providing a second portion of such impurity-containing gas mixture under a pressure only slightly above the desired rectification pressure and cooled to about its condensation temperature at such pressure; reducing the pressure of the remainder of said liquid fraction to form a scrubbing liquid; scrubbing such second portion of the gas mixture with said scrubbing liquid at about rectification pressure to collect the impurities substantially entirely in the scrubbing liquid; substantially vaporizing such scrubbing liquid by heat exchange with vapors of said first vaporization to form a concentrate of impurities and at least partially liquefy such vapors; withdrawing the impurity-containing concentrate; and passing the scrubbed second portion of gas mixture, the vapors of said second vaporization, the material of the vapor formed in said first vaporization, and the material of said gaseous fraction into rectifying apparatus for separation treatment in the absence of said impurities.

10. In apparatus for the elimination of higher boiling-point impurities in the separation of a gas mixture by rectification at low temperatures the combination with rectifying apparatus of means for supplying such impurity-containing gas mixture at a temperature and pressure such that a substantial portion thereof is liquid fraction and the remainder is cold gaseous fraction; a scrubber separator for scrubbing said gaseous fraction with said liquid fraction to concentrate said impurities substantially entirely in the liquid fraction and for separating such gaseous and liquid fractions; a first vaporizer for vaporizing a portion of said liquid fraction at an intermediate pressure by heat exchange with said gaseous fraction; a second vaporizer for substantially vaporizing the remainder of said liquid fraction by heat exchange with vapors produced in said first-mentioned vaporizer to form a concentrate of said impurities; means for withdrawing said concentrate of impurities; and means for passing the impurity-free material of said gaseous fraction and the vapors from both of said vaporizers into said rectifying apparatus.

11. Apparatus for the elimination of higher boiling-point impurities in the separation of gas mixtures by rectification at low temperatures according to claim 10, which includes means for supplying an additional portion of the gas mixture under a pressure substantially equal to the rectification pressure and cooled to about its condensation temperature and for conducting such cooled additional gas mixture to said second vaporizer to be scrubbed therein.

12. Apparatus for the elimination of higher boiling-point impurities in the separation of gas mixtures by rectification at low temperatures according to claim 10, in which conduit means is connected to the scrubber separator to withdraw liquid fraction therefrom and which conduit means is connected to said first and second vaporizers to pass portions of said liquid fraction to each of said vaporizers.

13. Apparatus for the elimination of higher boiling-point impurities in the separation of gas mixtures by rectification at low temperatures according to claim 10, which includes conduit means for transferring liquid fraction from said scrubber separator to said first vaporizer and conduit means for transferring a remainder of the liquid fraction from said first vaporizer to said second vaporizer.

14. Apparatus for the elimination of higher boiling-point impurities in the separation of gas mixtures by rectification at low temperatures according to claim 10, in which said first vaporizer is provided with a heat-exchange coil having one end connected to said scrubber separator to receive the gaseous fraction therefrom; a heat-exchange coil disposed within said second vaporizer; conduit means connected to said first vaporizer for conducting vapor therefrom to said heat-exchange coil in said second vaporizer; conduit means connecting the heat-exchange coil in said first vaporizer with the heat-exchange coil in the second vaporizer; and conduit means connecting the heat-exchange coil in said second vaporizer to said rectifying apparatus.

15. Apparatus for the elimination of higher boiling-point impurities in the separation of gas mixtures by rectification at low temperature according to claim 10, in which said first vaporizer is provided with a heat-exchange coil having one end connected to said scrubber separator to receive the gaseous fraction therefrom; a heat-exchange coil disposed within said second vaporizer; conduit means connected to said first vaporizer for conducting vapor therefrom to said heat-exchange coil in said second vaporizer; conduit means connecting the heat-exchange coil in said first vaporizer directly with said rectifying apparatus; and conduit means connecting the heat exchange coil in said second vaporizer directly to said rectifying apparatus.

16. In apparatus for the elimination of higher boiling-point impurities in the separation of gas mixtures by rectification at low temperatures the combination with rectifying apparatus of means for supplying such impurity containing gas mixture compressed to a relatively high pressure, for deeply cooling the same, and for expanding the same to form a liquid fraction and a cold gaseous fraction; a scrubber separator for scrubbing said gaseous fraction with said liquid fraction to concentrate said impurities substantially entirely in the liquid fraction and for separating such gaseous and liquid fractions; a vaporizer for vaporizing a portion of said liquid fraction at an intermediate pressure by heat exchange with said gaseous fraction; a second vaporizer for substantially vaporizing the remainder of said liquid fraction by heat exchange with material of said gaseous fraction to form a concentrate of said impurities; means for withdrawing said concentrate of impurities; and means for passing the impurity-free material of said gaseous fraction and the vapors from both said vaporizers into said rectifying apparatus.

PHILIP K. RICE.